Figure 1:
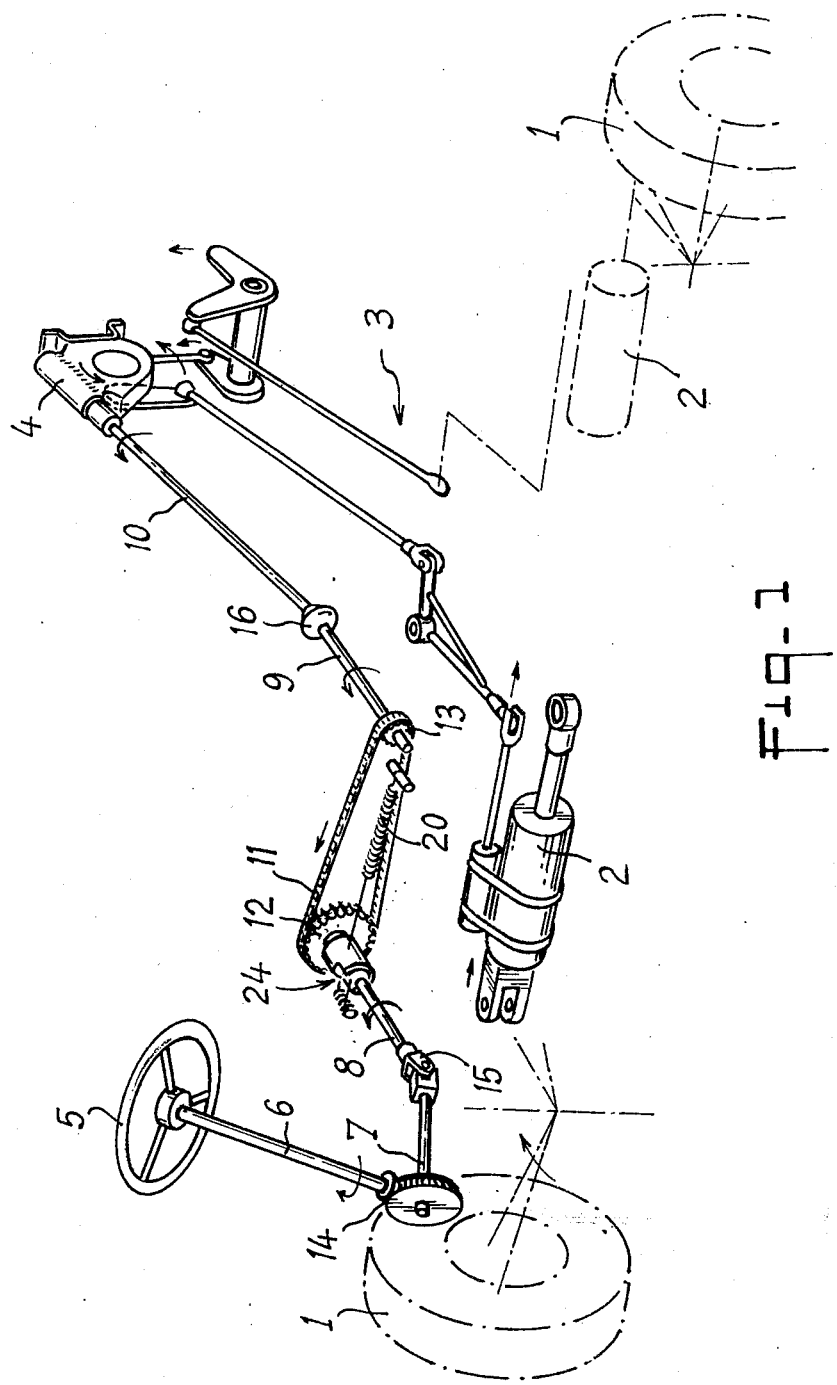

United States Patent [19]

Chanal

[11] 4,008,782
[45] Feb. 22, 1977

[54] RETURN DEVICE FOR STEERING MECHANISM

[75] Inventor: Roger Chanal, Saint-Etienne, France

[73] Assignee: Etat Francais represente par le Delegue Ministeriel pour l'Armement, Paris, France

[22] Filed: Mar. 27, 1975

[21] Appl. No.: 562,560

[30] Foreign Application Priority Data

Apr. 1, 1974 France .................... 74.12347

[52] U.S. Cl. .................... 180/132; 74/495; 280/94
[51] Int. Cl.² .................... B62D 5/06
[58] Field of Search .......... 180/79.2 R, 79.3, 132; 280/94, 96; 74/495, 388 PS; 91/387

[56] References Cited
UNITED STATES PATENTS

| 1,233,987 | 7/1917 | Corkran | 280/94 |
| 1,480,840 | 1/1924 | Rotermund | 280/94 |
| 1,633,695 | 6/1927 | Colley | 280/94 X |
| 3,374,850 | 3/1968 | Cech | 280/94 X |
| 3,636,794 | 1/1972 | Van Wicklin | 280/94 X |
| 3,833,235 | 9/1974 | Worsham | 280/94 |

*Primary Examiner*—Joseph F. Peters
*Assistant Examiner*—John A. Pekar
*Attorney, Agent, or Firm*—Brumbaugh, Graves, Donohue & Raymond

[57] ABSTRACT

A return device for a hydraulic steering mechanism of a vehicle includes an apparatus for automatically returning the wheels of the vehicle to a straight-ahead position after they are laterally pivoted by a steering wheel acting through a line of shafts. A hairpin spring is stressed by the rotation of a drum mounted on one of the shafts to create a resistance to further lateral pivoting of the vehicle wheels away from a straight-ahead position and a return force to return the vehicle wheels to a straight-ahead position. After the hairpin spring is stressed, a coil spring is tensioned by the rotation of the drum to create an additional resistance to further lateral pivoting of the vehicle wheels away from a straight-ahead position and an additional return force to return the vehicle wheels to a straight-ahead position.

15 Claims, 10 Drawing Figures

RETURN DEVICE FOR STEERING MECHANISM

This invention relates to a return device for a hydraulic steering mechanism of a vehicle.

It is known that certain vehicles, and in particular military vehicles, are provided with hydraulic steering mechanisms. This kind of steering mechanism generally presents the important problem of not having automatic returning of the steerable wheels into a position corresponding to travel of the vehicle in a straight line. A further problem is that the effort which it is required to provide to turn the steering wheel is quite independent of the orientation of the steerable wheels.

These two problems means that a driver is not fully able to achieve the real advantage of the theoretical maneuverability qualities of the vehicle, for example in the case of an all terrain type of vehicle.

The invention has for its object obviating the above disadvantages in providing a new automatic return arrangement for hydraulic steering mechanisms, having the advantage of progressively increasing the necessary effort to move the steering wheel to pivot the steerable wheels.

A return device, for a hydraulic steering mechanism comprises a steering wheel which acts on a linkage by means of an endless screw, the linkage operating the directional wheels by means of a principal jack, wherein the steering wheel is connected to the endless screw by means of at least one transmission axle on which a resilient means acts to give a resistance and to provide a return force which reduces when the angle of the steerable wheels from the straight-ahead position is reduced and which force is nil when the positions of the steerable wheels corresponds to a direction of travel of the vehicle in a straight line.

Figure 2:
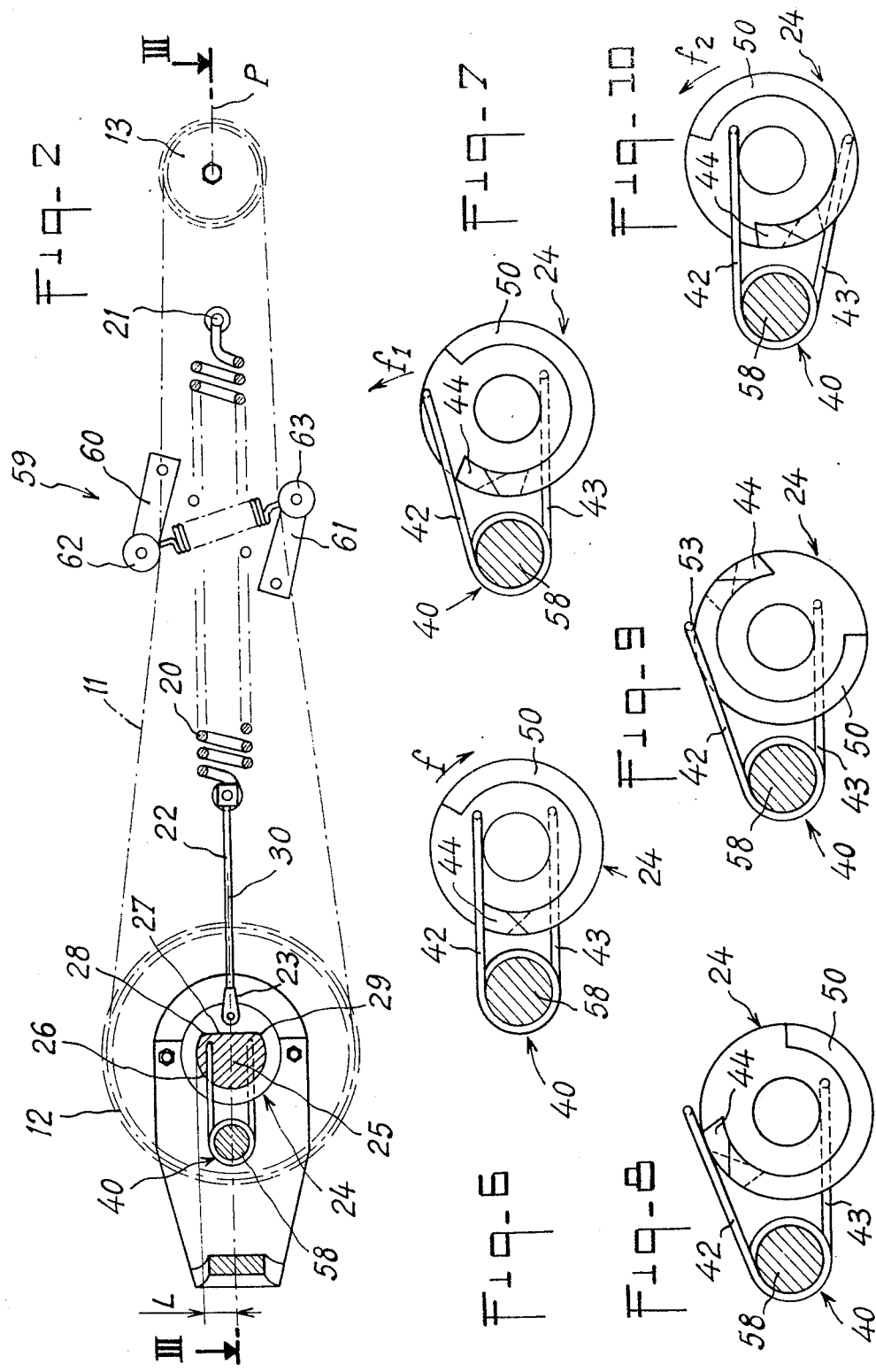
Figure 3:
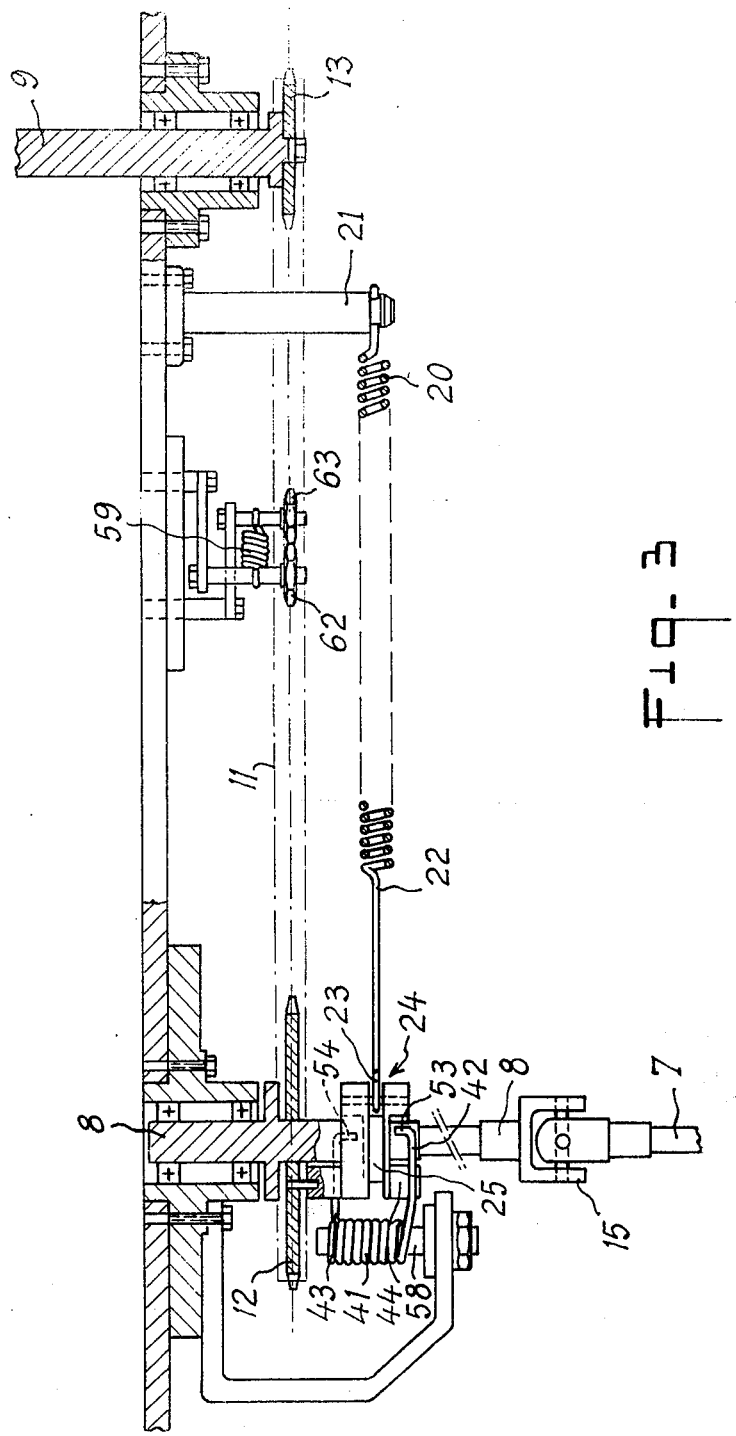
Figure 4:
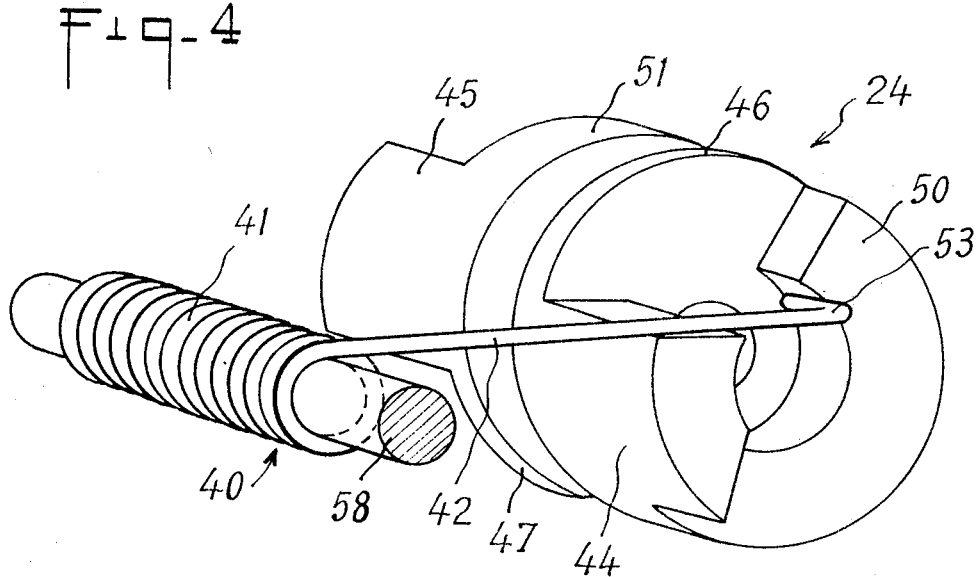
Figure 5:
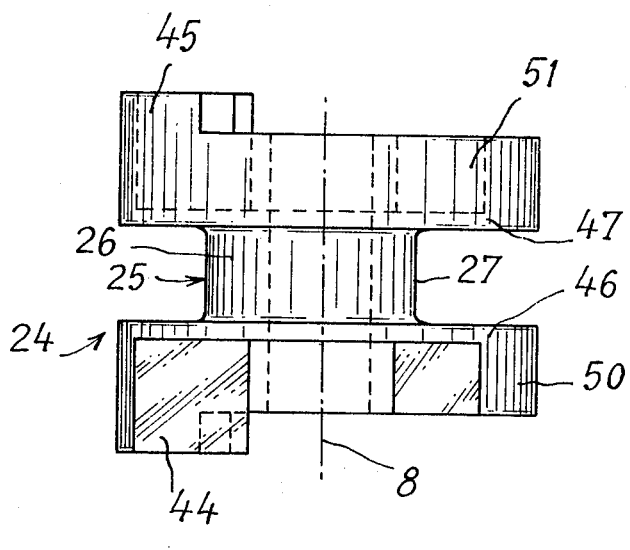

The accompanying drawings show an embodiment of the invention by which the characteristics of the invention may be understood. In the drawings:

FIG. 1 is a schematic perspective view of the assembly according to the invention, FIG. 2 is a view of a detail of the return device according to the invention, FIG. 3 is a part section taken along the line III—III in FIG. 2, FIG. 4 is a part perspective view showing in detail one of the parts of the device, FIG. 5 is a plan view of the part of FIG. 4, and FIGS. 6 to 10 are side elevations showing various positions characterizing the operation of the assembly of FIG. 4.

FIG. 1 shows a steering assembly according to the invention which acts on the steerable wheels 1 of a vehicle by means of two principal jacks 2.

A linkage 3 enables the feed to the jacks to be controlled. The linkage is attached by an endless screw 4 carried by the steering assembly and the return device according to the invention.

The steering assembly comprises a steering wheel 5 which is slightly laterally offset. The steering wheel 5 acts on two lines of shafts, one transverse line constituted by the shafts 6, 7 and 8 and a central line constituted by the shafts 9 and 10.

The two lines of shafts are connected together by means of the return device which comprises a chain 11 engaging with a large diameter sprocket 12 and a small diameter sprocket 13. The sprocket 12 is carried on the shaft 8 whereas the sprocket 13 is carried on the shaft 9.

The shafts 6 and 7 subtend between them substantially a right-angle and are connected by means of bevel gears 14. The shafts 7 and 8 are connected to each other by means of a universal joint 15. At the same time the shafts 9 and 10 are connected to each other by a universal joint 16. The shaft 10 carries the endless screw 4.

Referring to FIGS. 2 and 3 the return device also comprises a coil spring 20 which at one of its ends is anchored onto a fixed point 21 situated, for example, between the shafts 8 and 9. The other end of the spring 20 is fixed to a cable 22 which is attached by a coupling 23 onto a drum 24 formed by or supported on the shaft 8, for example, between the universal joint 15 and the sprocket 12. The drum 24 is formed at its central part with a rotatable cam-shaped, reduced diameter portion 25 presenting, in transverse section, a circular portion 26 having its axis on the axis of the shaft 8 and a flattened portion 27 connected by curved portions 28 and 29. Including the curved portions, the flattened portion 27 subtends an angle to the axis substantially equal to 180° extending equally to both sides of the geometrical axis, shown by 30, on which is situated the point of attachment 28. In the position of rest, as illustrated in FIG. 2, the axis 30 lies in a plane P passing through the shafts 8 and 9 and containing the spring 20 whereas the flattened portion 27 is disposed perpendicular to the plane P and facing the attachment point 21. The cam-shaped, reduced diameter portion 25 also presents a symmetrical profile with respect to the plane P.

If, in leaving the position shown in FIG. 2, the sprocket 12 is turned in one direction or the other, by means of the steering wheel 5, the cable 22 rotates about the cam-shaped, reduced diameter portion 25 whose profile has the effect of progressively increasing the length of the arm of the lever L until a maximum value corresponding to the radius of the circular portion 26 is reached. Simultaneously rotation of the cable 22 causes the tensioning of the spring 20 resulting in a progressive increase of the necessary effort for turning the steering wheel 5. The driver thus directly feels a physical sensation of an opposing force to counteract, thereby enabling him to take real account of the angular position of the steerable wheels.

The reaction of the spring 20 on being put under tension causes, as soon as the driver ceases acting on the driving wheel, the automatic return of the steering into a position of the steerable wheels corresponding to a straight-line movement of the vehicle. In effect, the reaction of the spring 20 causes the rotation of the cable which makes the cam-shaped, reduced diameter portion 25 turn, and consequently the shaft 8, in a direction opposite to the intentional action applied to the steering wheel. This rotation is transmitted by the shafts 9 and 10 to the linkage 3 so that the jacks 2 are fed to cause the wheels to return.

For obtaining a precise control in both directions, the chain 11 of the return device is associated with a tensioner 59 constituted by two rollers 62 and 63 carried by the two levers 60 and 61 and engageable on the chain through a common spring 64.

It will be appreciated that the arrangement described does not have an immediate working effect and response because the couple resulting is a function of the lengthening of the arm of the lever L and of the progressive tensioning of the spring 20. It should be possible to reduce the delay in initial effect to a nil or a negligible value in carefully applying initial tension to the spring 20. However such a solution would make problems in creating an increase in the force required, at the steering wheel, particularly at greater angles of the steerable wheels, beyond the level which is considered to exact too great a strength on the part of the driver.

According to the invention, the return device is, for this reason, provided with a resilient device 40 to function before the previously described operation is started and to partially compensate the action of the spring 20. This resilient device is constituted by a spring in the form of a hairpin type spring comprising at its central part several spiral turns 41 (FIGS. 2 and 4) threaded onto a fixed axle of reciprocation 58 extending parallel to the shaft 8 lying on the plane P. The ends 42 and 43 of the hairpin spring are placed on two bosses 44 and 45 respectively which are formed on part of the lateral faces of two plates 46 and 47 constituting the flanks of the drum 24. The bosses 44 nd 45 are extensions of part annular shoulders 50 and 51.

The extremities 53 and 54 of the ends 42 and 43 of the spring 40 are slightly bent towards the interior so as to be supported on the shoulders 50 and 51 when the drum 24 has been sufficiently turned. In the rest position the bosses 44 and 45 are located between the central part of the spring 40 and the shaft 8 which engages the sprocket 12. The ends 42 and 43 are seated lengthwise to be supported with respect to the shaft 8.

When the steering wheel is turned a small angle in one direction or the other from the position corresponding to travel in a straight line, only the hair pin spring 40 operates. In effect, when the steering wheel is moved so as to turn the drum in the direction of the arrow $f$ (FIG. 6), the end 42 of the spring 40 is lifted by the boss 44 in the direction of the arrow $f_1$ (FIG. 7) while the end 43 is supported on the shaft 8. During this movement the resistance given by the spring 40 is transmitted to the steering wheel, and the opposing action of the spring gives the steering mechanism a "feel" to the driver who is thus conscious of the extent to which he has changed the angular orientation of the steerable wheels. If the steering wheel is released it will be appreciated that the ends 42 and 43 in tightening themselves return the boss 44 to the position shown in FIG. 6 so that the steering wheel is urged into the position corresponding to that in which the vehicle travels in a straight line. On the other hand if turning of the steering wheel is continued, the boss 44 passes the bent over extremity 53 of the end 42. This end is supported against the shoulder 50 (FIG. 9) while the cable 22 starts to rotate onto the cam-shaped, reduced diameter portion 25. The length of the arm of the lever L progressively increases such that the next stage of operation of the return device is then taken by the spring 20, thereafter operating as explained previously.

Of course, if the steering wheel is turned so as to turn the drum 24 in the direction of the arrow $f_2$ (FIG. 10) the end 43 mores under the pressure of the boss 45, while the end 42 is supported against the shaft 8. The action of the spring 40 is thus the same as described previously.

The essential advantages of the invention lie in that the device is simple, relatively cheap and robust.

What we claim is:

1. A return device for a hydraulic steering mechanism of a vehicle, the steering mechanism including a steering wheel rotatable with a steering column connected by a line of rotatable shafts to a pair of guide wheels laterally pivotable from a straight-ahead position for controlling the direction of travel of the vehicle, comprising return means for automatically returning the guide wheels to a straight-ahead position after they have been laterally pivoted, the return means including a drum mounted on one of the shafts for rotation therewith; first resilient means engaging the drum in such a manner that the first resilient means is stressed selectively, depending upon the direction in which the guide wheels are laterally pivoted, by the rotation of the drum when the guide wheels are initially pivoted laterally from a straight-ahead position for providing a resistance to further lateral pivoting of the guide wheels away from a straight-ahead position and a return force to return the guide wheels to a straight-ahead position; and second resilient means connected to the drum in such a manner that the second resilient means is tensioned by the rotation of the drum for providing, after the first resilient means is stressed by the rotation of the drum, a resistance to further lateral pivoting of the guide wheels away from a straight-ahead position and a return force to return the guide wheels to a straight-ahead position.

2. A return device according to claim 1, wherein the drum includes a pair of plates and a reduced diameter portion, the first resilient means engaging the pair of plates and the second resilient means being connected to the reduced diameter portion.

3. A return device according to claim 2, wherein the first resilient means includes a hairpin spring having a pair of ends, one end of the hairpin spring engaging one plate of the drum in such a manner that when the guide wheels are initially pivoted laterally in one direction the one end of the hairpin spring is displaced from a rest position by the one plate and stressed to provide a resistance to further pivoting of the guide wheels in the one direction and a return force for returning the guide wheels to a straight-ahead position, the other end of the hairpin spring engaging the other plate of the drum in such a manner that when the guide wheels are initially pivoted laterally in the other direction the other end of the hairpin spring is displaced from a rest position by the other plate and stressed to provide a resistance to further pivoting of the guide wheels in the other direction and a return force for returning the guide wheels to a straight-ahead position.

4. A return device according to claim 3, wherein the second resilient means includes a coil spring having a pair of ends, one end of the coil spring being attached to the vehicle at a point fixedly positioned a spaced-apart distance from the drum, and a cable connected between the other end of the coil spring and the drum in such a manner that when the guide wheels are laterally pivoted in the one direction the cable rotates about the reduced diameter portion of the drum in a first direction to tension the coil spring and provide, after the one plate of the drum displaces the one end of the hairpin spring, a resistance to further pivoting of the guide wheels in the one direction and a return force for returning the guide wheels to a straight-ahead position and when the guide wheels are laterally pivoted in the other direction the cable rotates about the reduced diameter portion of the drum in a second direction opposite to the first direction to tension the coil spring and provide, after the other plate of the drum displaces the other end of the hairpin spring, a resistance to further pivoting of the guide wheels in the other direction and a return force for returning the guide wheels to a straight-ahead position.

5. A return device according to claim 4, further comprising an axle about which the hairpin spring is mounted, the axle being positioned such that the hairpin spring lies substantially in a horizontal plane including the longitudinal axis of the one shaft and sized such that the ends of the hairpin spring are positioned on opposite sides of the horizontal plane.

6. A return device according to claim 5, wherein the plates and reduced diameter portion of the drum are coaxial with the one shaft; and wherein the reduced diameter portion of the drum is cam-shaped with a symmetrical profile about the horizontal plane when the guide wheels are in a straight-ahead position.

7. A return device according to claim 6, wherein the reduced diameter portion of the drum is shaped to define a curve which progressively recedes about the longitudinal axis of the one shaft.

8. A return device according to claim 5, wherein the coil spring and the cable lie in the horizontal plane when the guide wheels are in a straignt-ahead position.

9. A return device according to claim 3, wherein the plates of the drum are located at opposite ends of the drum; and wherein the reduced diameter portion of the drum is positioned between the plates.

10. A return device according to claim 9, wherein the one plate of the drum includes a shoulder extending partially around the outer periphery of the plate and a boss extending partially around the outer periphery of the shoulder in such a manner that the one end of the hairpin spring rests on the one shaft when the guide wheels are in a straight-ahead position, engages the boss on the one plate when the guide wheels are initially pivoted laterally in the one direction and rests on the shoulder of the one plate after disengaging the boss of the one plate upon the further lateral pivoting of the guide wheels in the one direction, the resistance and return force being provided only when the one end of the hairpin spring engages the boss of the one plate; and wherein the other plate of the drum includes a shoulder extending partially around the outer periphery of the plate and a boss extending partially around the outer periphery of the shoulder in such a manner that the other end of the hairpin spring rests on the one shaft when the guide wheels are in a straight-ahead position, engages the boss on the other plate when the guide wheels are initially pivoted laterally in the other direction and rests on the shoulder of the other plate after disengaging the boss of the other plate upon the further lateral pivoting of the guide wheels in the other direction, the resistance and return force being provided only when the other end of the hairpin spring engages the boss of the other plate.

11. A return device according to claim 10, wherein the points of engagement between the bosses and the ends of the hairpin spring approach the extremity of the ends of the hairpin spring as the guide wheels pivot laterally away from a straight-ahead position.

12. A return device according to claim 1, wherein the resistances and return forces provided by the first and second resilient means act consecutively and are substantially zero when the guide wheels are in a straight-ahead position and increase progressively the further the guide wheels are pivoted laterally away from a straight-ahead position.

13. A return device according to claim 1, wherein the line of rotatable shafts includes two laterally spaced-apart lines of shafts, one line of shafts being connected to the steering column and having a large diameter sprocket mounted for rotation therewith, the other line of shafts being connected to the guide wheels and having a small diameter sprocket mounted for rotation therewith, the two lines of shafts being connected by an endless chain meshing with the sprockets.

14. A return device according to claim 13, wherein the one shaft is located in the one line of shafts and includes the large diameter sprocket.

15. A return device according to claim 1, wherein the guide wheels are suspended for vertical oscillatory motion independent of one another.

* * * * *